Figure 1:
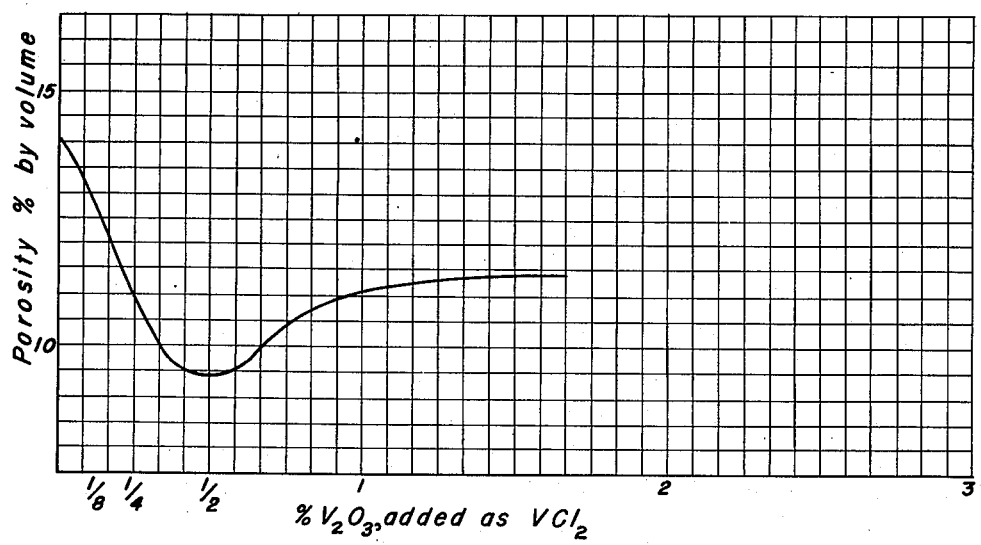

June 9, 1953          J. C. HICKS          2,641,532

PREPARATION OF MAGNESIUM OXIDE

Filed Nov. 8, 1949

INVENTOR.
JAMES C HICKS
BY James E. Toomey

Patented June 9, 1953

2,641,532

UNITED STATES PATENT OFFICE 2,641,532

PREPARATION OF MAGNESIUM OXIDE

James C. Hicks, Menlo Park, Calif., assignor to Kaiser Aluminum & Chemical Corporation, a corporation of Delaware Application November 8, 1949, Serial No. 126,106

12 Claims. (Cl. 23—201)

This invention relates to a method of forming crystalline magnesium oxide of high purity and of high density, with the aid of a catalyst which enables crystallization to take place at temperatures much lower than those previously considered operative for material of comparable purity.

Magnesium oxide in the pure state has been very difficult to prepare in crystalline form, heating to temperatures in excess of 2000° C. commonly being required for acceptable crystallization of even the technically pure grade. Even when fired as high as about 2200° C. the best non-fused product commercially available today has an apparent porosity of about 11% as measured by mercury displacement. Since such temperatures are very difficult to attain in fuel-fired furnaces, and since such porosity is higher than is acceptable for many purposes, crystalline magnesia of purity better than about 95% MgO is ordinarily prepared by fusion in electric furnaces. Such fusion is a difficult process and yields an expensive product which is relatively inert and unsatisfactory for some purposes. For example, unless of extremely high purity, electrically fused grain material is difficult to bond together to form satisfactory high temperature ceramic articles.

In order to allow crystallization of the magnesia to take place at lower temperatures, such as those attainable in a rotary kiln, e. g., 1800° C. or less, it has been the practice to employ an admixture of from 5 to 15 percent of impurities such as silica, lime, alumina, and iron oxide along with the magnesia. These impurities flux with the magnesia, allowing sintering and crystallization to take place at temperatures within the range from about 1550° C. to 1800° C. depending upon the amount and kind of additives. Even with the larger amounts of impurities, the highest temperatures are required to produce a material having practically negligible residual shrinkage, i. e., under about 5% porosity.

Although useful in allowing the burning of the magnesia to be done at lower temperatures, the presence of the large amounts of impurities in the magnesia is objectionable for many purposes, as for example where danger exists of chemical contamination. When the crystalline magnesia material is to be used for ceramic or refractory purposes, the impurities markedly reduce the over-all refractoriness of the material, and even more markedly lower its ability to bear load at high temperatures and its resistance to thermal spalling and to corrosion by acidic materials.

An object of this invention is to provide a method for forming crystallized magnesia of increased density and of increased hardness and resistance to impact. It is also an object of this invention to provide well-crystallized magnesium oxide of high purity without resorting to fusion or the addition of fluxes. Another object is to provide a method of forming crystalline, high purity magnesia at temperatures attainable in fuel-fired furnaces and, if desired, at high production rates. A further object is to provide a method whereby formation of crystalline magnesia from magnesia-yielding materials proceeds substantially to completion at much lower temperatures and more rapidly than has heretofore been possible with magnesia of comparable purity.

According to the present invention, the crystallization of magnesia and the formation of well-crystallized periclase from magnesium compounds which form or yield periclase upon firing is improved catalytically by the addition of up to about 5% of vanadium, calculated as $V_2O_3$ in the fired product. The vanadium is added as the metal or in the form of a compound. Preferably it is added as oxide or as a compound wherein the vanadium is present in the positive radical, such as vanadium chloride, oxychloride, or other halide or oxyhalide, or as vanadyl sulfate or the like. When the vanadium or vanadium compound is added as a solid it is added in finely divided form to ensure thorough dispersion and intimate admixture with the periclase-yielding component of the mix. Preferably, the vanadium component is added as a solution or suspension in a liquid, for example, in water or an alcohol, to ensure such dispersion and admixture. Mixtures of the vanadium compounds, with vanadium metal or with each other, can be employed. When vanadium metal is added, firing is preferably carried out under oxidizing conditions.

Figure 2:
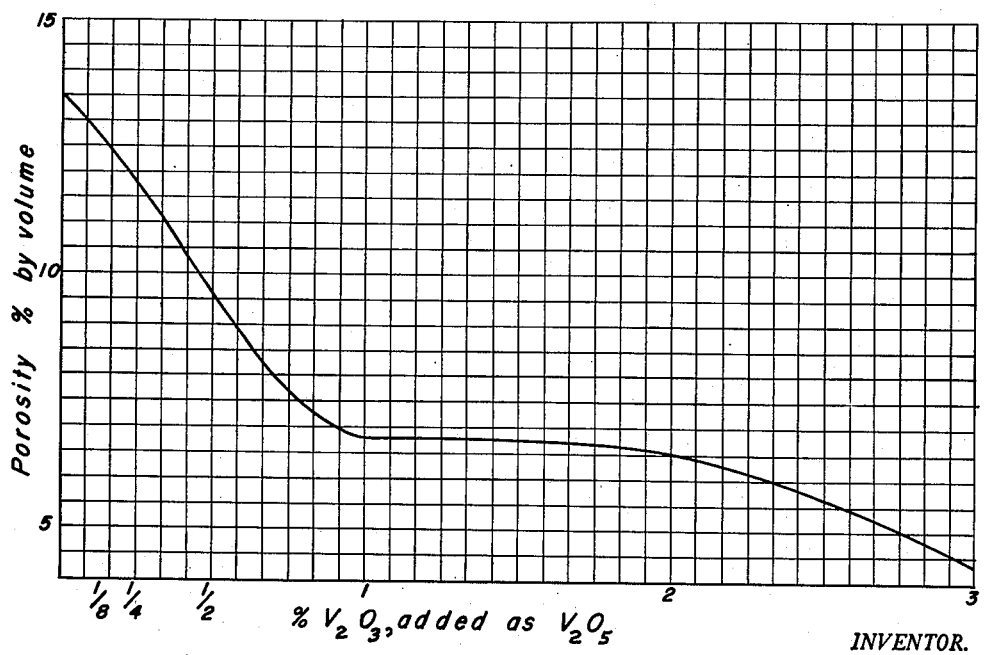

Figure 1 is a graph showing the improvement in porosity of periclase, obtained by adding vanadium dichloride; and Figure 2 is a graph showing the improvement obtained by adding vanadium pentoxide.

The magnesia starting material is a magnesium compound which will form, or yield, periclase upon firing under crystallizing conditions. Such material is finely divided and includes magnesium hydroxide, magnesium carbonate, magnesium basic carbonate, magnesium acetate, magnesium alcoholate, magnesite, brucite, etc. The invention is particularly effective when employing as starting material a finely divided precipitated compound such as magnesium hydroxide, magnesium carbonate, magnesium basic carbonate etc., or amorphous or cryptocrystalline magnesia. By cryptocrystalline magnesia is meant magnesium oxide which exists in very small crystals, that is, which has not reached crystallization equilibrium. Such magnesia, for example, is that obtained by firing a magnesia-yielding compound, e. g., magnesium hydroxide, carbonate or basic carbonate, to, for instance, not over about 1100° C. for not over about 45 minutes. Cryptocrystalline magnesia can be prepared in other ways, as long as the firing conditions are so controlled that the bulk density of the magnesia obtained is not over about 1.5 grams per cc., measured on particles ground in a ball mill to pass a 200 mesh (United States Bureau of Standards) screen. Magnesia so obtained is not shrunken and well-crystallized, but exists in the cryptocrystalline state. The crystal size of such material increases and the porosity decreases when treated according to this invention. Another suitable starting material is hydrated magnesia. Mixtures of the above-described magnesium compounds can be employed. The magnesia obtained upon firing any of these starting materials preferably contains at least 95.0% magnesium oxide and less than 2.0% $SiO_2$. Sometimes it is preferred that the magnesia contain less than 2.0% of lime, CaO.

The vanadium component added in the process of this invention is added in very small amounts, calculated as $V_2O_3$; for example, ⅛%, based on the weight of the fired product, producing a marked decrease in porosity. The best crystallization and the lowest apparent porosities are obtained with starting materials of the highest purities. Especially good results, as to decrease in porosity, are obtained with additions of from about ⅛% to about 1%, calculated as $V_2O_3$ and based on the weight of the fired product.

The periclase-yielding material and the vanadium material are thoroughly and intimately admixed and fired to crystallization temperature. Mixing can be done in the dry state, for example, by thoroughly milling together. Preferably, the vanadium material is added as a suspension or solution in a liquid used to temper the mix, for example, as a solution of a salt. The tempering liquid is preferably water. The vanadium material can be admixed with a magnesium compound which will yield magnesia upon calcining, for example, magnesium hydroxide or carbonate, the mixture calcined until cryptocrystalline magnesia is formed, the mass pressed with or without further addition of vanadium material, and the pressed mass fired. To obtain the desired crystallization, the mixtures should be fired finally at a temperature at which shrinkage occurs, that is, at 1300° C. or higher.

When vanadium or a vanadium compound is added to high-purity periclase-yielding material in an amount which will provide up to about 5% of the element, calculated as $V_2O_3$, in the fired product, there is obtained better crystallization of the magnesium oxide at any stated firing temperature, or equivalent crystallization at a lower firing temperature, when compared with like magnesia material without such additive, this effect being obtained without appreciable loss in refractoriness. It is an advantage of the present process, for example, that magnesia treated as described can be fired to crystallization equilibrium at a temperature about 400° C. below that heretofore required for firing magnesia of high purity. Furthermore, the product is denser, and larger crystals are obtained than are obtained when magnesia of the same purity is fired without the addition of a material as described. It is also an advantage that tougher and stronger crystal aggregates are obtained by the addition of vanadium material.

It has been found, according to the present invention, that the porosities of portions of magnesium compounds modified by the addition of a vanadium component and fired, as described, decrease abruptly with additions of up to about 1% of the vanadium compound, calculated as $V_2O_3$ on the fired basis. After the first, most marked, decrease the porosities often tend to rise slightly, without reaching a value as high as the porosity of the fired starting material without additive, but sometimes the porosities then level off or tend to decrease further. Suitably, up to about 5.0% of the vanadium component, calculated as $V_2O_3$, is added.

Figure 1 represents the porosities of periclase obtained in a series of tests wherein varying amounts of vanadium dichloride are added to the periclase-yielding starting material. In these tests magnesium hydroxide obtained by treating seawater with calcined dolomite to precipitate $Mg(OH)_2$, and washing and filtering the precipitate, is divided into five portions and vanadium dichloride solution is intimately admixed with each of four of these in amounts to provide respectively, ⅛%, ¼%, ½% and 1% vanadium calculated as $V_2O_3$ in the final, fired product. The remaining portion contains no vanadium additive and is the control. Each portion is dried and formed into pellets, and fired at 1700° C. The results are plotted in Figure 1 and show the marked decrease in porosity of the periclase obtained with $VCl_2$ addition, over that of the portion where no $VCl_2$ was added (13.5%).

Figure 2 represents a similar series of tests run on another batch of $Mg(OH)_2$ obtained from seawater in like manner. In these tests, however, vanadium is added to each of six portions as finely divided $V_2O_5$, in amounts to give, respectively, ⅛%, ¼%, ½%, 1%, 2% and 3% of vanadium, calculated as $V_2O_3$, in the final, fired product. To a seventh portion no vanadium compound is added. All portions are likewise dried, pelleted and fired at 1700° C. The porosities as shown in Figure 2 demonstrate the marked decrease obtained upon addition of the vanadium compound.

The method of carrying out the process of this invention, and the product obtained thereby, are more clearly illustrated by the examples below.

*Example 1*

Magnesium hydroxide is produced by reacting sea water with calcined dolomite, recovering the precipitate, and washing and filtering it. With 1820 parts by weight of the filter cake so obtained and containing 27% equivalent MgO are admixed about 1000 parts by weight of water and then there are added 1.02 parts by weight of vanadium dichloride, $VCl_2$, corresponding to ⅛% $V_2O_3$ in the fired product, dissolved in about 20 parts by weight of water containing a small amount of hydrochloric acid to prevent precipitation of the vanadium compound. The whole is thoroughly mixed, dried, pelleted under about 8000 pounds per square inch pressure and fired at 1700° C. for one-half hour in a periodic kiln.

A portion of the filter cake without additive is treated in the same way. The periclase grain obtained with the addition of the vanadium component is very hard and resistant to breakage upon impact, and it exhibits a porosity of 9.4%; while the grain obtained from the portion without additive exhibits a porosity of 14.1%.

*Example II*

6.0 parts by weight of $V_2O_5$, ground in a ball mill until 90% passes 200 mesh, are intimately mixed with 494 parts by weight of magnesia in the form of magnesium hydroxide filter cake, also obtained by treating sea water with calcined dolomite to precipitate $Mg(OH)_2$, washing and filtering. The mixture is dried, pelleted and a portion is fired at 1700° C. for one-half hour. Another portion of the magnesium hydroxide filter cake is treated in exactly the same way but without the addition of vanadium compound. The fired material containing vanadium exhibits a porosity of 6.7%, while that fired without any additive exhibits a porosity of 13.5%. A second portion of the pelleted material without additive is fired at 1500° C. for one-half and exhibits a porosity of 19.2% after firing; and a portion of the pelleted material containing 1% vanadium, calculated as $V_2O_3$, similarly fired at 1500° C., exhibits a porosity of 15.6%.

The apparent porosities of the various materials shown in this specification are determined by the mercury displacement method, employing vacuum to remove entrained or entrapped air and making the tests on particles of the materials which pass 6 mesh and are retained on 10 mesh (Bureau of Standards screens).

The magnesia starting materials are finely divided and are preferably of a size to substantially all pass 200 mesh. When solid vanadium or vanadium compound is employed, it is suitably used in a particle size substantially all passing 200 mesh.

In other variations of this process, magnesia which is in the so-called "active" state, that is, which has not been heated to crystallization equilibrium and which is still cryptocrystalline, or even amorphous, can be employed as a starting material, as also can other magnesium compounds, such as magnesium carbonate or basic carbonate, magnesium acetate or the like, which upon firing yield, or form, magnesia.

Other firing temperatures, that is, of at least 1300° C., can be employed for sufficient periods of time to provide a well-crystallized grain. For speed and efficiency, somewhat higher firing temperatures are sometimes preferred. It is a particular advantage of this invention that a well-crystallized high-purity magnesia grain can be obtained by firing at temperatures considerably lower than are required for firing magnesia of such purity without the added compound or compounds. This invention enables firing such magnesia in a rotary kiln to obtain the desired crystallization, or at an equivalent temperature and for an equivalent time. If desired, the admixed substances, if in slurry form, can be introduced directly into the rotary kiln, and dried and fired in one operation.

It is particularly advantageous, in making a dense grain material, to press an intimate admixture of cryptocrystalline magnesia and vanadium material, and then to fire the pressed admixture to crystallization equilibrium, to form well-crystallized periclase. Such an admixture can be obtained by calcining a mixture of a magnesia-yielding compound and vanadium material to form a cryptocrystalline magnesia-containing admixture which may contain the vanadium component in the form in which it was first added, or the vanadium material may have been converted to the oxide or to a compound with a small amount of the magnesia or with some other minor constituent of the mix. This admixture can be pressed and fired, or there can be mixed therewith additional vanadium material, as described above to give a total content of vanadium calculated as $V_2O_3$, on the fired basis, of up to about 5%, and the total mix pressed and fired. Alternatively, in this embodiment cryptocrystalline magnesia can be admixed with the vanadium material as described and in the amount described, and the admixture pressed and fired.

The manner in which the invention functions to bring about better development of the crystallization of high-purity magnesias at lower firing temperatures is not completely understood. Without intending to be limited thereby, the following is one theory of the operation of this invention.

When magnesia-yielding materials, particularly precipitated substances which, upon heating or firing, yield magnesia containing less than 2% $SiO_2$, and preferably less than 2% CaO, or cryptocrystalline magnesia of the same purity, are so heated as to produce magnesia in crystalline form, very little coalescence or crystal growth occurs and the magnesia crystals obtained are still very finely divided and of extensive surface. As stated hereinabove, electric fusion serves to form larger crystals but at high cost, and the addition of fluxing ingredients introduces substantial amounts of impurities which alter the physical and chemical characteristics of the product. It is apparent that the addition of a substance of the class described in this invention does not act in the manner of a fluxing agent because the optimum amounts employed are too small, and increasing amounts of other impurities which normally act as fluxing agents tend to hinder the crystallization-promoting action of the added substance. These considerations are contrary to the operation of the commonly used fluxing materials. The effect of adding the substance as described is evidently not to cause fusion or sintering because the effect is apparently greater on higher purity material. The phenomenon is considered to be a catalyzing effect because it has been observed that the small additions of the substances noted initiate crystallization more rapidly, and produce better crystallization than is obtained with the untreated magnesia. This invention enables the production of well-crystallized magnesia by firing under conditions usually attainable in the rotary kiln, that is, at temperatures not over about 1800° C. and for periods not exceeding about an hour. The product, because of its dense structure, high purity, low residual shrinkage, and hardness, is desirable for use in a number of fields. It is highly useful, for instance, for refractories, heat-exchange media and abrasives.

In this specification and claims porosity where expressed is in percentage by volume and other percentages and parts are by weight. In conformity with common practice in reporting chemical analyses of refractory materials, in the specification and claims the proportions of the various chemical constituents present in a material are given as though these constituents were present as the simple oxides. Thus, the magnesium constituent is referred to as magnesium oxide or MgO, the lime constituent as CaO, the silicon constituent as $SiO_2$, and so on for other elements reported, although the silica and lime and a very small proportion of the MgO, for example, may be present in combination with each other or with another minor constituent. For example, the term "1.0% by weight of $V_2O_3$" or "of vanadium as, or calculated as, $V_2O_3$" is intended to mean that a chemical analysis of the material referred to would show the vanadium content as 1.0% expressed as $V_2O_3$, although in reality all of the vanadium might be present in the form of a compound with magnesia or in some other combined form.

The term "magnesium compound which will yield periclase upon firing" is intended to include cryptocrystalline magnesia, or amorphous magnesia, as well as magnesium compounds such as magnesium hydroxide, magnesium carbonate or basic carbonate, magnesium alcoholate, magnesium acetate and the like which decompose upon calcining to yield magnesia, and when fired form periclase.

Having now described the invention, what is claimed is:

1. Process for preparing crystalline magnesia which comprises uniformly admixing a finely divided magnesium compound which upon firing will form periclase containing at least 95.0% magnesium oxide and not over 2.0% silica and at least one substance chosen from the group consisting of vanadium and vanadium compounds in an amount which will provide up to about 5% by weight of vanadium, calculated as $V_2O_3$, in the fired product, and firing said mixture at a temperature of at least 1300° C. to form crystalline magnesia.

2. Process for preparing well-crystallized periclase which comprises uniformly admixing a finely divided precipitated magnesium compound which upon firing will yield periclase containing at least 95.0% magnesium oxide and not over 2.0% $SiO_2$, and at least one substance chosen from the group consisting of vanadium and compounds of vanadium, in an amount to provide up to about 5.0% by weight of vanadium, calculated as $V_2O_3$, in the fired product, and firing said admixture at a temperature of at least 1300° C. to form well-crystallized periclase.

3. Process for preparing well-crystallized periclase which comprises uniformly admixing a finely divided precipitated magnesium compound which upon firing will yield periclase containing at least 95.0% magnesium oxide and not over 2.0% $SiO_2$, a tempering amount of water and at least one substance chosen from the group consisting of vanadium and vanadium compounds, in an amount to provide up to about 5.0% by weight of vanadium, calculated as $V_2O_3$, in the fired product, pressing said admixture, and firing said pressed admixture at a temperature of at least 1300° C. to form well-crystallized periclase.

4. Process as in claim 3 wherein the magnesium compound is magnesium hydroxide.

5. Process as in claim 3 wherein the vanadium compound is a water-soluble vanadium compound, containing vanadium in the positive radical.

6. Process as in claim 3 wherein the vanadium compound is vanadium dichloride.

7. Process as in claim 3 wherein the vanadium compound is a vanadium oxide.

8. Process as in claim 3 wherein the admixture is fired at a temperature of from about 1300° C. to about 1800° C. for not over about an hour to form well-crystallized periclase.

9. Process as in claim 3 wherein said periclase contains at least 95.0% magnesium oxide, not over 2.0% $SiO_2$, and not over 2.0% CaO.

10. In the preparation of dense, well-crystallized periclase, the steps of pressing an intimate admixture of cryptocrystalline magnesia which upon firing will form periclase containing at least 95.0% magnesium oxide and not over 2.0% silica and at least one substance chosen from the group consisting of vanadium and compounds of vanadium, in an amount to provide up to about 5.0% of vanadium, calculated as $V_2O_3$, in the fired product, and firing said pressed admixture at a temperature of at least 1300° C. to form well-crystallized periclase.

11. In the preparation of dense, well-crystallized periclase, the steps of pressing an intimate admixture of cryptocrystalline magnesia-containing product which upon firing will form periclase containing at least 95.0% magnesium oxide and not over 2.0% silica and at least one substance chosen from the group consisting of vanadium and compounds of vanadium, in an amount to provide up to about 5.0% of vanadium, calculated as $V_2O_3$, in the fired product, and firing said pressed admixture at a temperature of at least 1300° C. to form well-crystallized periclase.

12. Process for preparing crystalline magnesia which comprises uniformly admixing a finely divided magnesium compound which upon firing will form periclase containing at least 95.0% magnesium oxide and not over 2.0% silica and at least one substance chosen from the group consisting of vanadium and vanadium compounds in an amount to provide from 1/8% to 1% by weight of vanadium, calculated as $V_2O_3$, in the fired product, and firing said admixture at a temperature of from 1300° C. to 1800° C. to form crystalline magnesia.

JAMES C. HICKS.

References Cited in the file of this patent

UNITED STATES PATENTS

| Number | Name | Date |
| --- | --- | --- |
| 2,281,477 | Chesny | Apr. 28, 1942 |
| 2,313,746 | Heany | Mar. 16, 1943 |
| 2,487,290 | Austin et al. | Nov. 8, 1949 |
| 2,487,497 | Vettel | Nov. 8, 1949 |
| 2,537,014 | Austin | Jan. 9, 1951 |